(12) United States Patent
Liu et al.

(10) Patent No.: US 8,270,147 B2
(45) Date of Patent: Sep. 18, 2012

(54) EXTENSIBLE BASE PAD MODULE AND ELECTRICAL DEVICE WITH THE SAME

(75) Inventors: Tsung-Chin Liu, Taipei County (TW); Shen-Yuan Yu, Taipei County (TW); Chao-Hung Lin, Taipei County (TW)

(73) Assignee: Quanta Computer Inc., Taoyuan Shien (TW)

( * ) Notice: Subject to any disclaimer, the term of this patent is extended or adjusted under 35 U.S.C. 154(b) by 344 days.

(21) Appl. No.: 12/654,488

(22) Filed: Dec. 22, 2009

(65) Prior Publication Data

US 2011/0058315 A1    Mar. 10, 2011

(30) Foreign Application Priority Data

Sep. 7, 2009   (TW) .............................. 98216492 U

(51) Int. Cl.
*H05K 7/16*   (2006.01)
(52) U.S. Cl. ............ 361/679.01; 248/295.11; 292/251.5
(58) Field of Classification Search ............ 361/679.01, 361/679.08, 679.02, 679.59, 679.41–679.44; 292/251.5; 248/295.11, 188.8, 188.9; 16/33, 16/34

See application file for complete search history.

(56) References Cited

U.S. PATENT DOCUMENTS

| | | | | |
|---|---|---|---|---|
| 3,825,218 | A * | 7/1974 | Krumbein et al. ............ 248/466 |
| 5,168,427 | A * | 12/1992 | Clancy et al. ............ 361/679.12 |
| 6,762,931 | B2 * | 7/2004 | Chen ........................ 361/679.11 |
| 6,935,661 | B1 * | 8/2005 | Farnsworth et al. .......... 292/162 |
| 7,564,215 | B2 * | 7/2009 | Wang et al. .................... 320/107 |
| 7,617,568 | B2 * | 11/2009 | Jing .............................. 16/286 |

* cited by examiner

*Primary Examiner* — Jinhee Lee
*Assistant Examiner* — Ingrid Wright
(74) *Attorney, Agent, or Firm* — Rabin & Berdo, P.C.

(57) ABSTRACT

An extensible base pad module and an electrical device with the same are disclosed. The electrical device has a base and an extensible base pad module. The base has an opening. The extensible base pad module has a push bar, a flange and a pad. The push bar is able to be levelly moved in the opening, and has a through hole thereon. The flange is disposed in the base, and has an arc-shaped rail of which two ends are respectively close and remote from the opening. One end of the pad is moveably provided in the arc-shaped rail, the other end is extensible in the through hole.

20 Claims, 7 Drawing Sheets

EXTENSIBLE BASE PAD MODULE AND ELECTRICAL DEVICE WITH THE SAME

RELATED APPLICATIONS

This application claims priority to Taiwan Application Serial Number 98216492, filed Sep. 7, 2009, which is herein incorporated by reference.

BACKGROUND

1. Technical Field

The disclosure relates to an electrical device, more particularly to a base pad module for an electrical device.

2. Description of Related Art

A base of a conventional notebook computer is often provided with a placing surface having buffer pads for being placed on a tabletop. When the notebook computer is placed on the tabletop, since the buffer pads lift the notebook computer apart from the tabletop, in one aspect, more air flows can be led into a space between the placing surface and the tabletop for assisting heat dissipation; in another aspect, the notebook computer can be protected from being damaged by vibration or friction.

However, because the mentioned buffer pads are often installed on the placing surface of the base by adhesive, the heights (i.e. thicknesses) of the buffer pads are fixed. Therefore, since the limited space between the placing surface and the tabletop cannot be easily altered, the air flows accordingly within the space are also limited.

Moreover, the base is also installed a replaceable rechargeable battery on the placing surface thereof. When the rechargeable battery is a battery with standard specification, the rechargeable battery would not overly protrude from the placing surface. So when the notebook computer is placed on the tabletop, the buffer pads would be in contact with the tabletop for lifting the notebook computer up before the rechargeable battery in contact with the tabletop, therefore the possibility of the rechargeable battery being scratched by foreign objects is decreased.

However, when the rechargeable battery of the notebook computer is replaced with a high capacity rechargeable battery with a higher (thicker) dimensional size; instead of the buffer pads, the high capacity rechargeable battery would be firstly in contact with the tabletop, so the buffer pads are suspended and lose the function which should have provided, and the rechargeable battery, at such arrangement, is more likely to be scratched or damaged by foreign objects.

SUMMARY

Therefore, an aspect of the present disclosure is to present an extensible base pad module and an electrical device with the same, which is served to lift an electrical device for increasing distance between the electrical device and a contact surface so as to improve the inconvenience of space limitation between the electrical device and the contact surface.

The electrical device comprises a base and a base pad module installed therein. The base is installed with an inner surface, an outer surface opposite to the inner surface, and an opening passing through the inner and the outer surfaces. The base pad module includes a push bar, at least one flange and a pad. The push bar is moveably installed on the opening, and has a through hole communicating with the opening. The flange is disposed in the base, and has an arc-shaped rail. One end of the arc-shaped rail is disposed close to the opening, and the other end of the arc-shaped rail is disposed remote from the opening. One end of the pad protrudes the through hole and the other end of the pad is moveably installed on the arc-shaped rail, when the other end of the pad is moved along the arc-shaped rail, the end of the pad is retracted or protruded outside the through hole.

In one optional embodiment, the two flanges are installed in parallel and disposed at two opposite sites of the opening, and the two arc-shaped rails face each other. Each of the flanges includes a board member and an external assembling strip. The board member is vertically installed on the inner surface. The assembling strip is detachably installed on the board member, so the arc-shaped rail is defined between the assembling strip and the board member.

Optionally, the base and the board member are formed detachably or integrally.

In the other embodiment, a concave slot is provided to the base on the outer surface, wherein the opening is disposed at the bottom of the concave slot. The push bar includes a sheet member and a latching member. The sheet member is linearly and moveably installed in the concave slot. One end of the latching member is connected to the sheet member; the other end of the latching member is disposed against the inner surface through the opening. The surface of the sheet member exposing outside the concave slot is installed with a plurality of protruding members.

In another embodiment, the pad includes a block-shaped member and two convex shafts. The block-shaped member is disposed between the flanges. The two convex shafts are respectively installed at two opposite sides of the block-shaped member, and respectively installed in the corresponding arc-shaped rail, so as to drive the block-shaped member to move along an extending direction of the arc-shaped rail. The material of which the block-shaped member is made can be plastic, rubber, silicon or latex.

In another embodiment, the electrical device is a notebook computer, and the outer surface thereof is defined as a placing surface of the base. The placing surface is further provided with a battery device, the height that the pad extending from the placing surface is higher than the height that the battery device protruding from the placing surface.

As mentioned above, the extensible base pad module of this invention increases the space between the electrical device and the tabletop for allowing more air flows, and heat dissipation efficiency of the electrical device can be increased, and the possibility that the rechargeable battery installed in the base of the electrical device being scratched by the contact surface is lowered.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
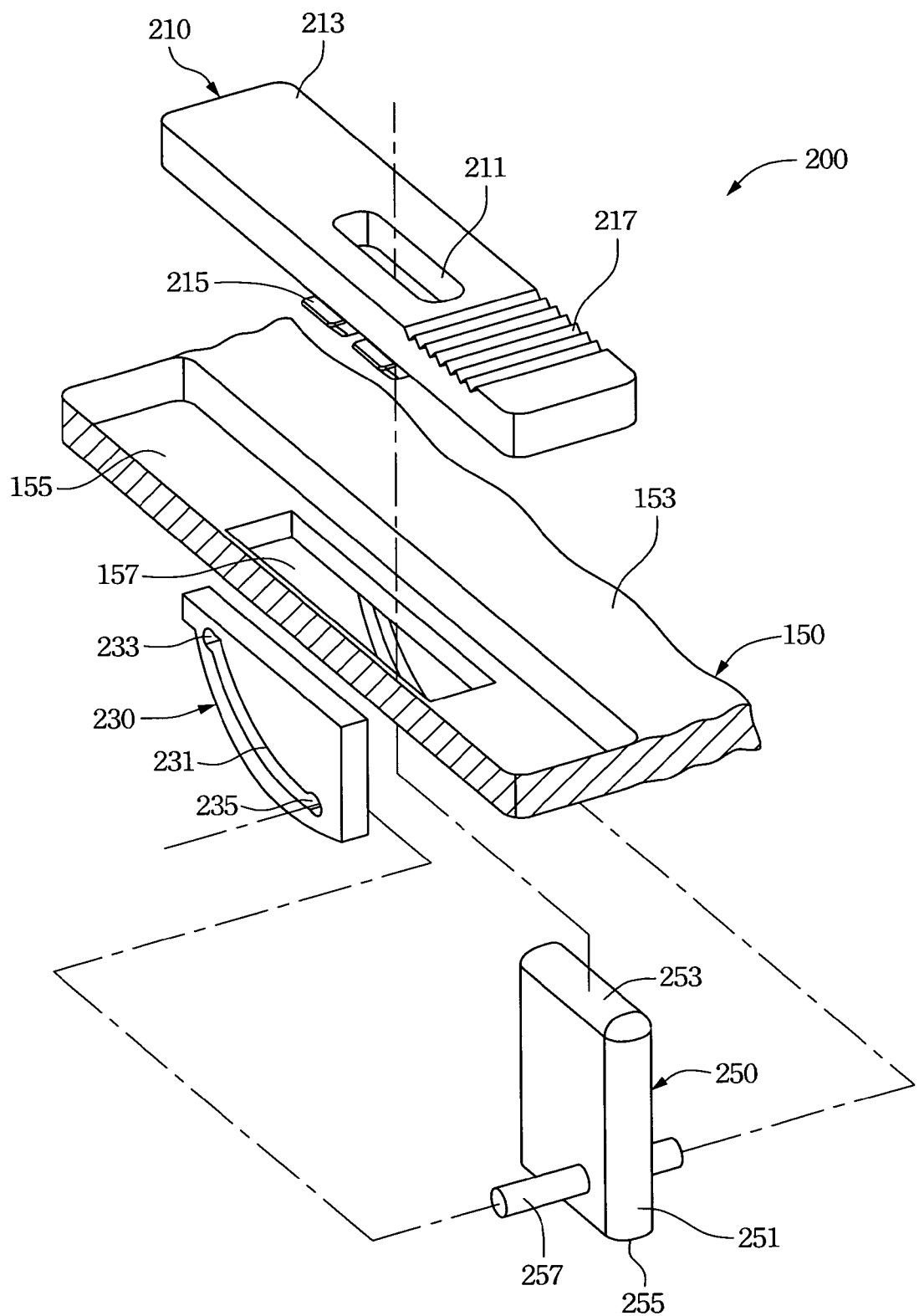
FIG. 1 is a schematic exploded view of the extensible base pad module of one embodiment of the present invention.

Referring to FIG. 1, which is a schematic exploded view of the extensible base pad module 200 of one embodiment of the present invention. The present disclosure provides an electrical device with extensible base pad module and an extensible base pad module thereof. The base pad module 200 is installed in a base 150, and comprises a push bar 210, at least one flange 230 and a pad 250. The push bar 210 has a through hole 211, and is exposed outside the base 150 for being pulled or pushed by a user. The flange 230 is disposed in the base 150, and has an arc-shaped rail 231, a first end 233 of the arc-shaped rail 231 is disposed close to the push bar 210, a second end 235 thereof is disposed remote from the push bar 210. The pad 250 is placed adjacent to the flange 230, one end thereof extends out of the through hole 211, the other end thereof is able to move along the arc-shaped rail 231.

Figure 2A:
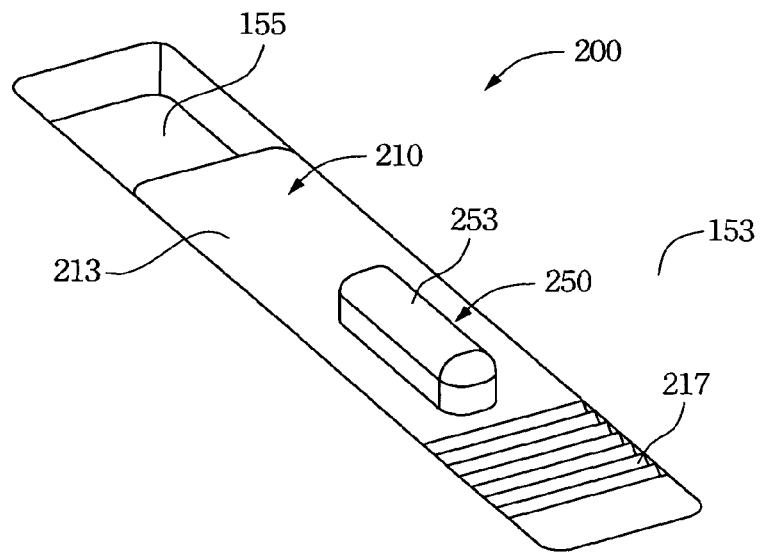
FIG. 2A is a schematic exterior view of the assembly of the base shown in FIG. 1.
Figure 2B:
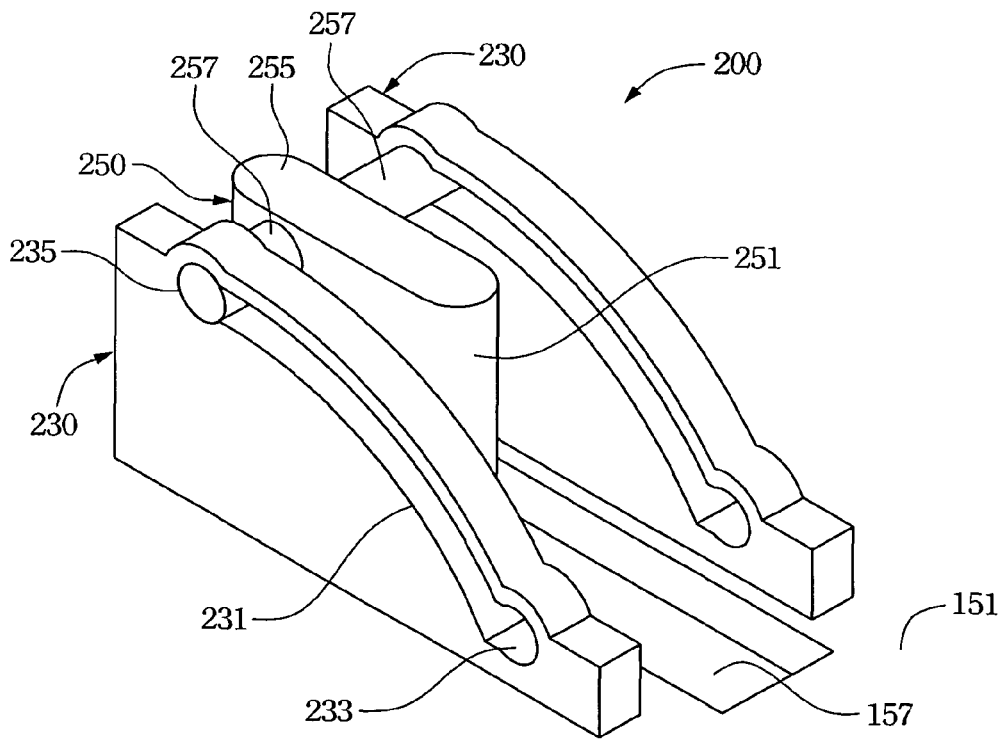
FIG. 2B is a schematic interior view of the assembly of the base shown in FIG. 1.
Figure 2C:
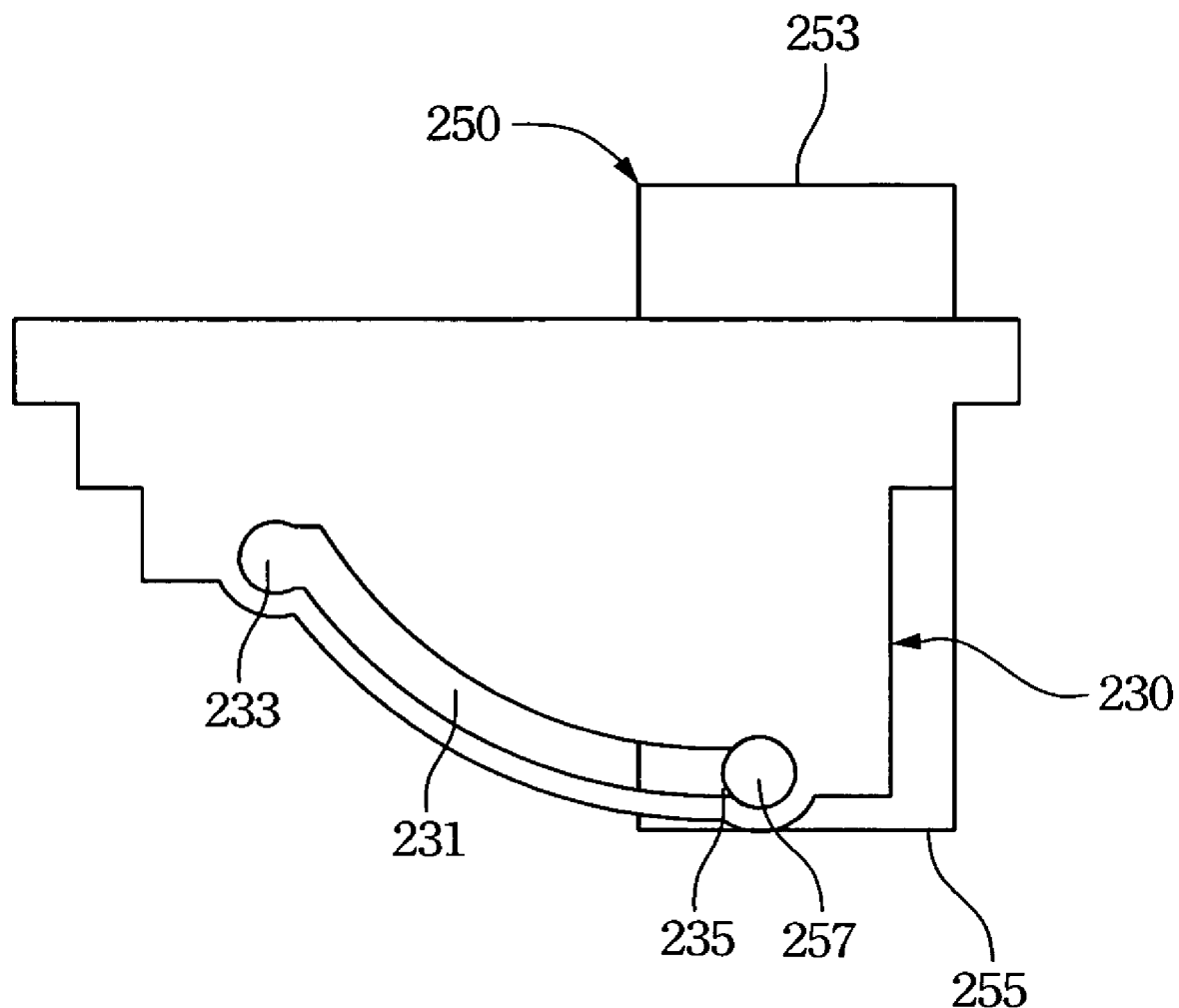
FIG. 2C is a schematic lateral view illustrating an operating status of FIG. 2B.

Referring from FIG. 2A to FIG. 2C, wherein FIG. 2A is a schematic exterior view of the assembly of the base shown in FIG. 1; FIG. 2B is a schematic interior view of the assembly of the base shown in FIG. 1; FIG. 2C is a schematic lateral view illustrating an operating status of FIG. 2B.

The base 150 is formed with an outer surface 153, an inner surface 151 and an opening 157. The outer surface 153 is defined as a placing surface for the base 150 being placed on a contact surface (e.g. a tabletop). The inner surface 151 is defined as a surface opposite to the placing surface of the base 150. The opening 157 is installed on the base 150 and through the inner surface 151 and the outer surface 153.

In this embodiment, the base pad module 200 is installed with two flanges 230 that are respectively and vertically installed on the inner surface 151 and disposed at two opposite sides of the opening 157, and the two arc-shaped rails 231 face each other. The flanges 230 are installed in parallel, and the arc-shape rails 231 installed thereon face each other.

In this embodiment, the base 150 is installed with a concave slot 155 concavely provided on the outer surface 153 in which the opening 157 is disposed at the bottom of the concave slot 155. The push bar 210 for example includes a sheet member 213 and two latching members 215. The sheet member 213 is linearly and moveably installed in the concave slot 155, and is able to linearly move back and forth in the concave slot 155, the through hole 211 of the push bar 210 is in communication with the opening 157. One end of each of the latching members 215 is respectively connected to two opposite sides of the sheet member 213, the other end thereof is respectively disposed against the inner surface 151 through the opening 157, so the sheet member 213 is prevented from releasing from the opening 157 while being moved back and forth.

A surface of the sheet member 213 not facing the concave slot 155 is further installed with a plurality of protruding members 217, e.g. protruding particles or protruding strips, for assisting a user to pull or push the push bar 210 more easily.

In another embodiment, the pad 250 further includes a block-shaped member 251 and two convex shafts 257. The block-shaped member 251 is disposed between the flanges 230, and is provided with a first end 253 and a second end 255 opposite to each other. The first end 253 of the block-shaped member 251 protrudes the through hole 211 through the opening 157, and is driven to move with the push bar 210. One end of the convex shafts 257 are respectively disposed at two opposite sides of the block-shaped member 251 near the second end 255, and another ends thereof are respectively installed in the corresponding arc-shaped rail 231. Thus, the convex shafts 257 can be driven by the sheet member 213 to drive the block-shaped member 251 to move along an extending direction of the arc-shaped rail 231.

It is to be noted that the first end 233 and the second end 235 of the arc-shaped rail 231 includes a concave portion having a shape corresponding to the convex shaft 257 for fastening the convex shaft 257. Moreover, the material of the pad 250 can be plastic, rubber, silicon, latex or combination thereof, or at least the material of which the block-shaped member 251 is made can be plastic, rubber, silicon, latex or combination thereof.

FIG. 2A to FIG. 2C illustrate an operating status before the pad 250 is extended, in such status, the height that the pad 250 extending from the base 150 is substantially the same as the height that a convectional buffer pad extending from a base.

Figure 3A:
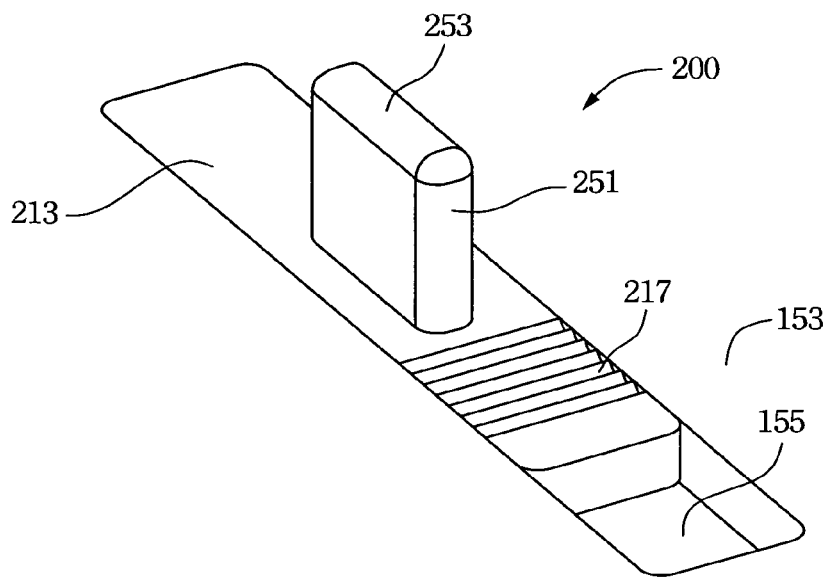
FIG. 3A is a schematic view illustrating an operating status of FIG. 2A after the pad being extended.
Figure 3B:
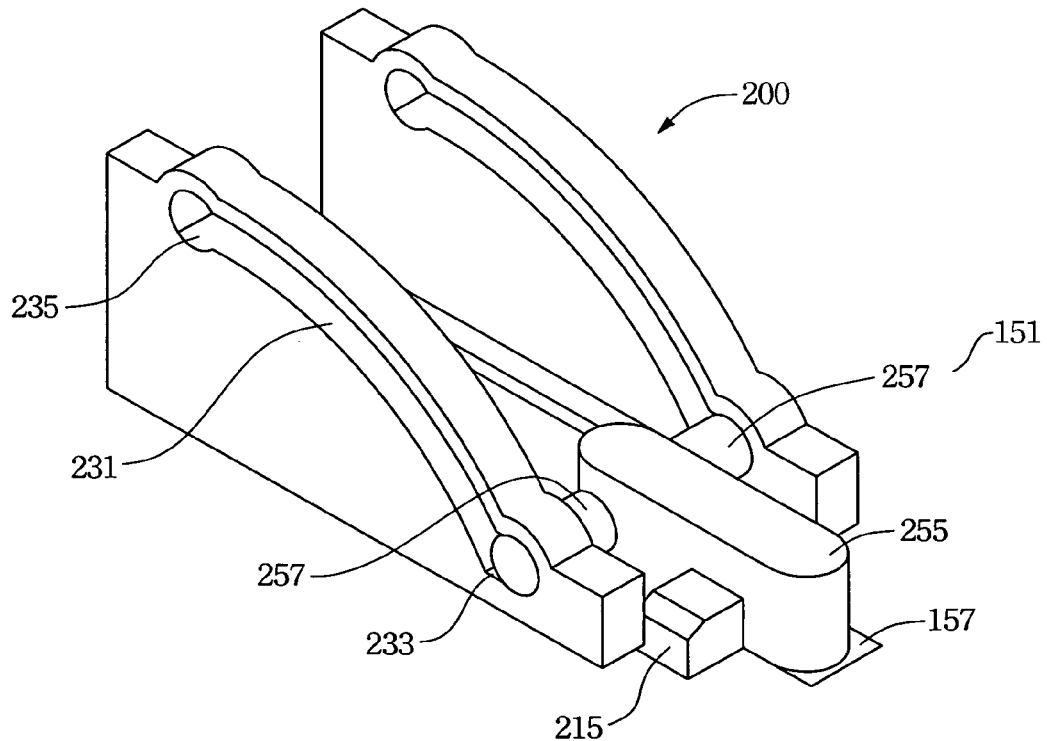
FIG. 3B is a schematic view illustrating an operating status of FIG. 2B after the pad being extended.
Figure 3C:
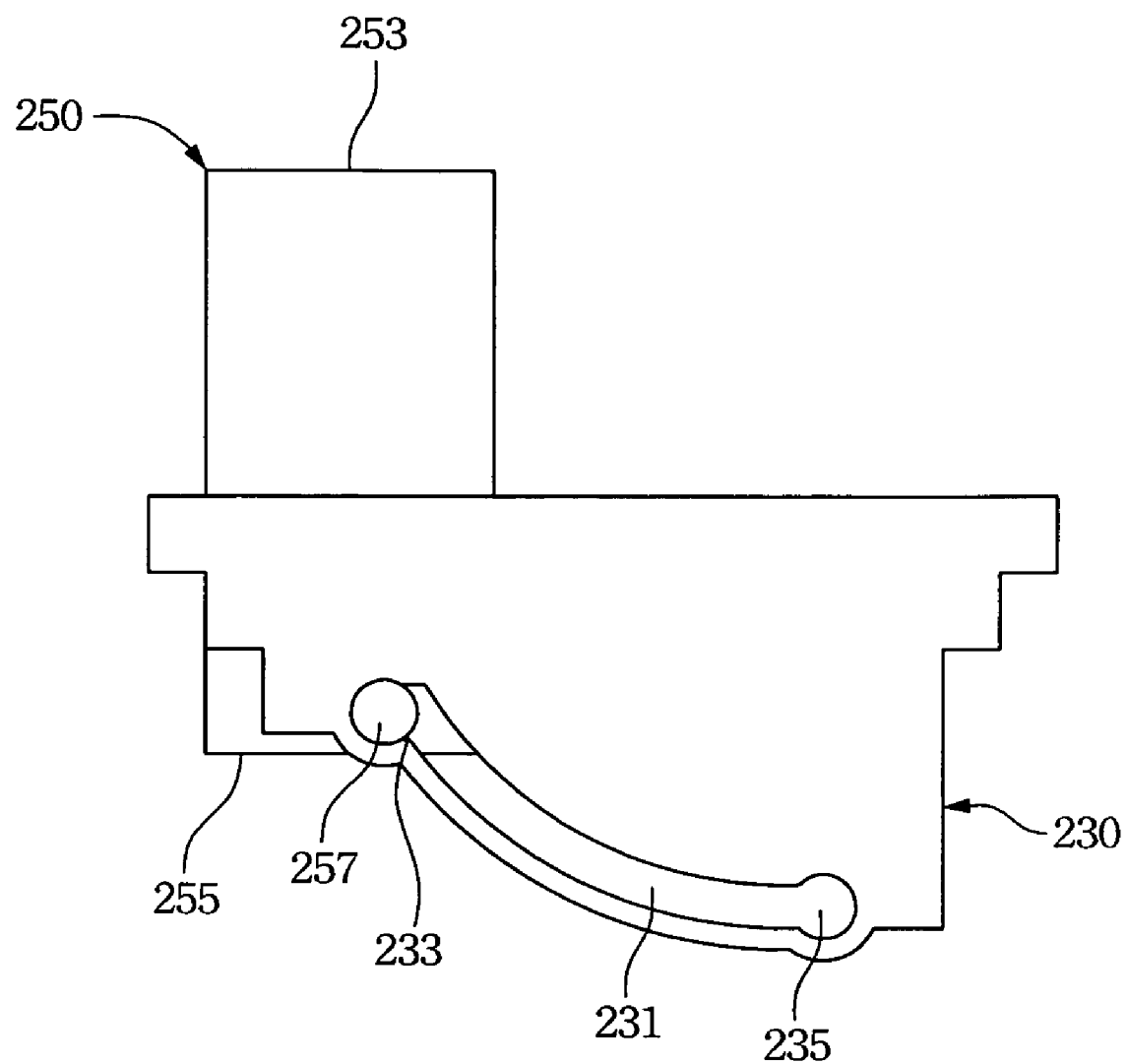
FIG. 3C is a schematic lateral view illustrating an operating status of FIG. 3B.

Referring from FIG. 3A to FIG. 3C, wherein FIG. 3A is a schematic view illustrating an operating status of FIG. 2A after the pad being extended; FIG. 3B is a schematic view illustrating an operating status of FIG. 2B after the pad being extended; FIG. 3C is a schematic lateral view illustrating an operating status of FIG. 3B.

When a user would like to increase the space between the contact surface and the base 150, e.g. for a purpose of using a thicker battery or increasing heat dissipation efficiency, the pad 250 needs to be further extended from the base 150, so with aid of the protruding members 217 of the sheet member 213, the user can move the push bar 210 along an extending direction of the opening 157, the pad 250 is therefore driven by the sheet member 213 to move, e.g. moving from the status shown in FIG. 2A to the status shown in FIG. 3A. Each of the convex shafts 257 is moved along the extending direction of the corresponding arc-shaped rail 213, e.g. moving from the status shown in FIG. 2B to the status shown in FIG. 3B, therefore is moved from the second end 235 of the arc-shaped rail 213 to the first end 233 of the arc-shaped rail 213 and is fastened in the first end 233, and the first end 253 of the block-shaped member 251 gradually and outwardly extends from the through hole 211, e.g. moving from the status shown in FIG. 2A to the status shown in FIG. 2B, in other words the height that the pad 250 protruding from the base 150 in FIG. 3A is higher than the height that the pad 250 protruding from the base 150 in FIG. 2A. By such, when the base 150 is placed on the contact surface, the outward extended pad 250 can be provided for increasing the height between the base 150 and the contact surface, so more air flows can be generated and heat dissipation efficiency is increased.

On the other hand, if the user would like to reversely move the push bar 210, e.g. from the status in shown FIG. 3A to the status shown in FIG. 2A, each of the convex shafts 257 is moved along the corresponding arc-shaped rail 231, e.g. from the status shown in FIG. 3B to the status shown in FIG. 2B, and is moved towards the second end 235 of the arc-shaped rail 231. Therefore, the first end 253 of the block-shaped member 251 is gradually retracted in the through hole 211 and the pad 250 is recovered to its original height protruding from the through hole 211 as shown in FIG. 2A.

Figure 4:
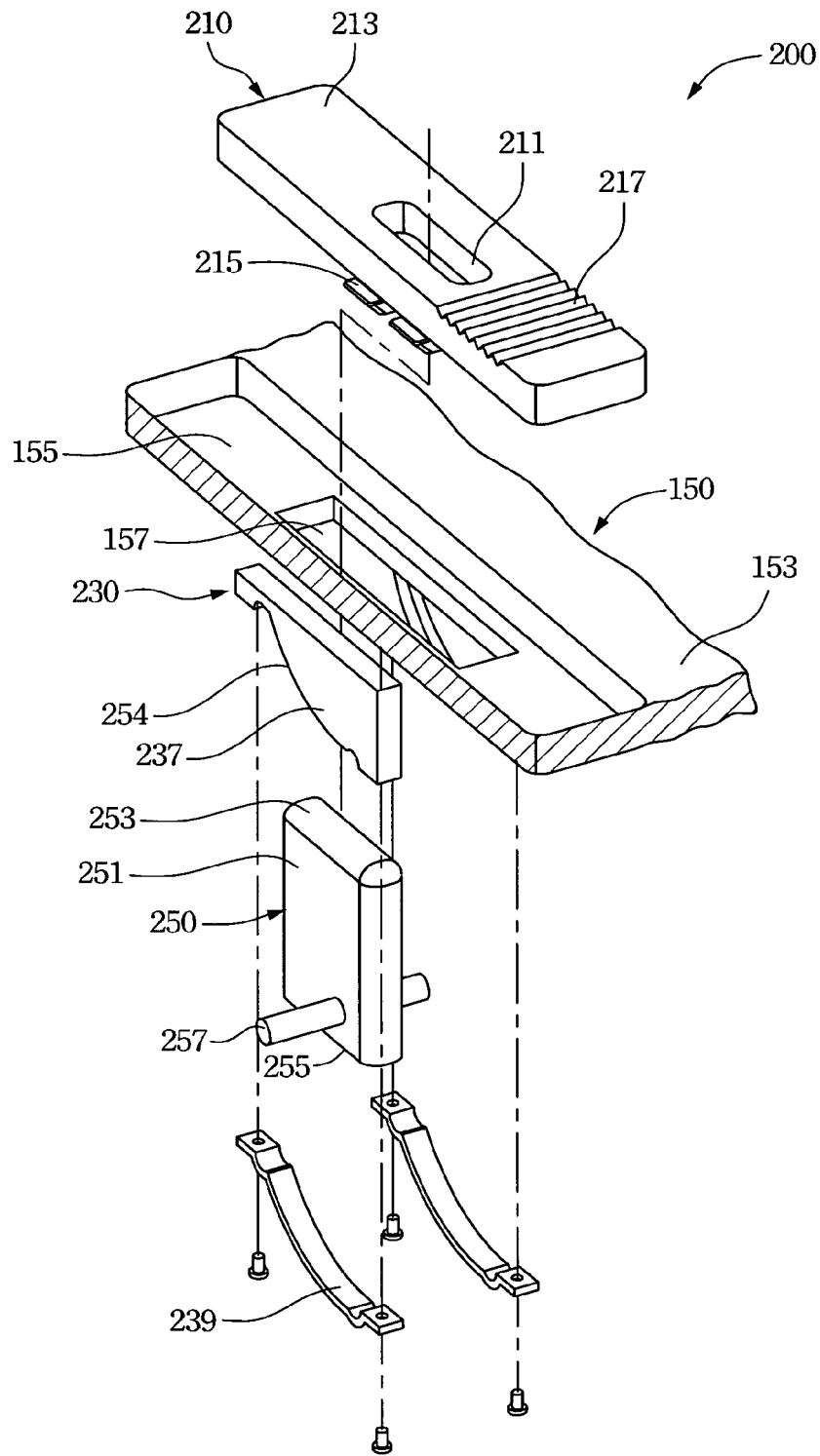
FIG. 4 is an exploded view of the extensible base pad module of another embodiment of the present invention.

Referring to FIG. 4, which is an exploded view of the extensible base pad module of another embodiment of the present invention. The flange 230 can be further installed with a board member 237 and an external assembling strip 239. The board member 237 is detachably fastened on the inner surface 151 (as shown in FIG. 2B), and is perpendicular to the inner surface 151. The board member 237 has an arc-shaped surface 254. The assembling strip 239 is detachably assembled on the arc-shaped surface 254 of the board member 237 via fastening units, so the gap defined between the assembling strip 239 and the board member 237 forms the mentioned arc-shaped rail 231.

It is to be noted that the combination means of the board member 237 and the base 150 can be detachably combined or formed as one piece, and the assembling strip 239 is able to be assembled on the board member 237 regardless the combination means of the board member 237 and the base 150 is detachably combined or formed; as one piece, so as to form the flange 230 having the arc-shaped rail 231. By this way, a more convenient means for assembly is provided, arc-shaped rail 231 is not needed to be additionally formed on the flange 230.

Figure 5:
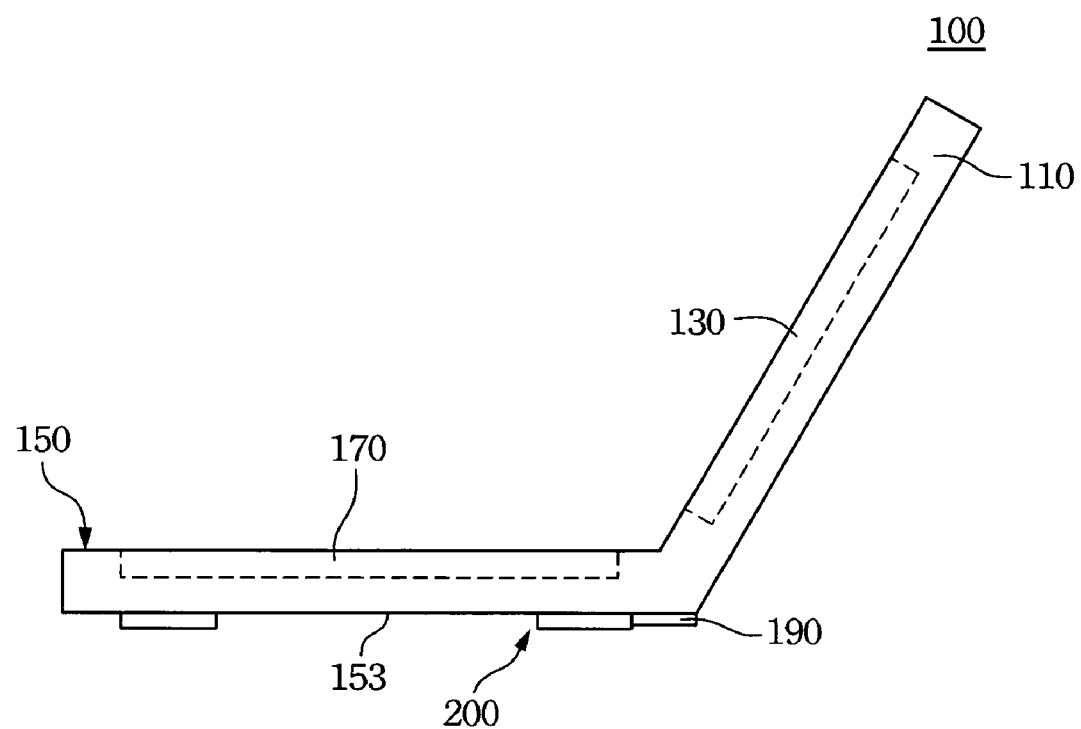
FIG. 5 is a schematic appearance view of the electrical device of one embodiment of the present invention.

Referring to FIG. 5, which is a schematic appearance view of the electrical device of one embodiment of the present invention. The base 150 can be a part of an electrical device, and the electrical device in this embodiment can be a notebook computer 100. Other electrical devices that need a base pad for a base also can be applied the feature of the present invention, for example a personal computer, a mouse device or a telephone.

Refer to FIG. 5 and FIG. 2A to FIG. 2C. The notebook computer 100 is installed with a front cover 110 and a base 150 pivoted to the front cover 110. The front cover 110 is installed with a display screen 130 while the base 150 is installed with a keyboard device 170 and the base pad module 200. The mentioned outer surface 153 is defined as a placing surface allowing the base 150 of the notebook computer 100 to be placed on a contact surface, e.g. a tabletop. The mentioned inner surface 151 is defined as an inner wall surface of the base 150 of the notebook computer 100.

The base 150 is further installed with a replaceable battery device 190 on the placing surface. If the height of the battery device 190 of the notebook computer 100 is higher than the height of a conventional battery device, through operating the base pad module 200 for extending the pad 250, the height (thickness) that the pad 250 protruding from the base 150 is greater than the height (thickness) that the battery device 190 protruding from the base 150, so the pad 250 is in contact with the contact surface before the battery device 190, thus the battery device 190 is prevented from being scratched or damaged by the contact surface.

According to the above mentioned embodiments of the present invention, the extensible base pad module and electrical device with the same provided by the present invention has the following advantages.

With the feature that the pad of the base pas module of the present invention is extendable, an electrical device can be lifted to a higher position by the pad so as to increase the space between the electrical device and a contact surface for allowing more air flows, the heat dissipation efficiency of the electrical device is improved and components, e.g. a battery device, between the base and the contact surface are protected from not being scratched or damaged.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An electrical device with extensible base pad module, comprising:
    a base having an inner surface, an outer surface opposite to the inner surface and an opening passing through the inner surface and the outer surface; and
    a base pad module, comprising:
    a push bar moveably installed on the opening and having a through hole communicating with the opening;
    at least one flange installed in the base and having an arc-shaped rail of which one end thereof is disposed close to the opening and the other end thereof is disposed remote from the opening; and
    a pad having one end thereof protruding through the through hole, and another end thereof being moveably installed on the arc-shaped rail,
    wherein when the push bar is moved, the push bar causes the another end of the pad to move along the arc-shaped rail, so that the one end of the pad is retracted or protruded outside the through hole and beyond the outer surface of the base.

2. The electrical device with extensible base pad module according to claim 1, wherein the at least one flange comprises:
    a board member vertically installed on the inner surface; and
    an external assembling strip detachably installed on the board member, wherein the arc-shaped rail is formed between the assembling strip and the board member.

3. The electrical device with extensible base pad module according to claim 2, wherein the board member and the base are formed integrally or detachably with each other.

4. The electrical device with extensible base pad module according to claim 1, wherein the push bar comprises:
    a sheet member; and
    a latching member, one end thereof connected to the sheet member, the other end thereof disposed against the inner surface through the opening.

5. The electrical device with extensible base pad module according to claim 4, wherein the outer surface has a concave slot, the opening is disposed at a bottom of the concave slot, and the sheet member is linearly and moveably installed in the concave slot.

6. The electrical device with extensible base pad module according to claim 5, wherein the sheet member has a plurality of protruding members.

7. The electrical device with extensible base pad module according to claim 1, wherein the pad comprises:
    a block-shaped member, one end thereof protruding the opening through the through hole; and
    two convex shafts respectively disposed at two corresponding sides of the block-shaped member, and respectively installed in one of the arc-shaped rails, so as to drive the block-shaped member to move along a direction of the arc-shaped rail.

8. The electrical device with extensible base pad module according to claim 7, wherein the block-shaped member is made of plastic, rubber, silicon or latex.

9. The electrical device with extensible base pad module according to claim 1, wherein the quantity of the at least one flange is two, the two flanges are in parallel and respectively disposed at two opposite sites of the opening, and the arc-shaped rails face each other.

10. The electrical device with extensible base pad module according to claim 1, wherein the electrical device is a notebook computer, and the outer surface is defined as a placing surface of the base.

11. An extensible base pad module implemented on a base of an electrical device, comprising:
   a push bar having a through hole for being moved outside the base;
   two flanges respectively disposed on the base at two opposite sides of the push bar and installed in parallel and respectively having an arc-shaped rail, the arc-shaped rails face each other, and one end of each of the arc-shaped rails is disposed close to the push bar and another end of each of the arc-shaped rails is disposed remote from the push bar; and
   a pad disposed between the two flanges, one end of the pad protruding through the through hole, another end of the pad being moveably installed on the arc-shaped rails, wherein when the push bar is moved, the push bar causes the another end of the pad to move along the arc-shaped rails, so that the one end of the pad is retracted or protruded outside the through hole and beyond an outer surface of the base.

12. The extensible base pad module according to claim 11, wherein the pad comprises:
   a block-shaped member; and
   two convex shafts respectively disposed at two opposite sides of the block-shaped member, and respectively installed in one of the arc-shaped rails, so as to drive the block-shaped member to move along a direction of the arc-shaped rail.

13. The extensible base pad module according to claim 12, wherein the block-shaped member is made of plastic, rubber, silicon or latex.

14. The extensible base pad module according to claim 11, wherein the push bar comprises:
   a sheet member; and
   a latching member, one end thereof connected to the sheet member, the other end thereof disposed against the base.

15. The extensible base pad module according to claim 14, wherein the sheet member has a plurality of protruding members.

16. The extensible base pad module according to claim 11, wherein each of the flanges comprises:
   a board member; and
   an external assembling strip detachably installed on the board member, and the arc-shaped rail is formed between the external assembling strip and the board member.

17. An extensible base pad module implemented on a base of an electrical device, comprising:
   a push bar having a through hole for being moved outside the base;
   two flanges respectively disposed on the base at two opposite sides of the push bar and respectively having an arc-shaped rail, each of the arc-shaped rails has a first end and a second end, the first ends are disposed close to the push bar, the second ends are disposed remote from the push bar; and
   a pad disposed between the two flanges, one end thereof protruding through the through hole, another end thereof being optionally fastened on one of the first ends and the second ends of the arc-shape rails,
   wherein when the push bar is moved in a first direction, the push bar causes the another end of the pad to be pushed along the arc-shaped rails to move to the first end of the arc-shaped rails, so that the pad protrudes from the base with a first height,
   when the push bar is moved in a second direction, the push bar causes the another end of the pad to be pushed along the arc-shaped rails to move to the second end of the arc-shaped rails, so that the pad protrudes from the base with a second height, the first height being greater than the second height.

18. The extensible base pad module according to claim 17, wherein the pad comprises:
   a block-shaped member; and
   two convex shafts respectively disposed at two opposite sides of the block-shaped member, and respectively installed in one of the arc-shaped rails, so as to drive the block-shaped member to move along a direction of the arc-shaped rail.

19. The extensible base pad module according to claim 17, wherein the push bar comprises:
   a sheet member; and
   a latching member, one end thereof connected to the sheet member, the other end thereof disposed against the base.

20. The extensible base pad module according to claim 17, wherein each of the flanges comprises:
   a board member; and
   an external assembling strip detachably installed on the board member, and the arc-shaped rail is formed between the external assembling strip and the board member.

* * * * *